United States Patent
Ushiro et al.

(10) Patent No.: US 7,511,784 B2
(45) Date of Patent: Mar. 31, 2009

(54) HOLOGRAM COLOR FILTER, METHOD FOR FABRICATING THE SAME, AND COLOR LIQUID CRYSTAL DISPLAY COMPRISING IT

(75) Inventors: Toshihiko Ushiro, Hyogo (JP); Kazuhiko Oda, Hyogo (JP); Soichiro Okubo, Hyogo (JP); Takashi Matsuura, Hyogo (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 397 days.

(21) Appl. No.: 10/593,248

(22) PCT Filed: Mar. 11, 2005

(86) PCT No.: PCT/JP2005/004281

§ 371 (c)(1),
(2), (4) Date: Sep. 15, 2006

(87) PCT Pub. No.: WO2005/088364

PCT Pub. Date: Sep. 22, 2005

(65) Prior Publication Data

US 2008/0165399 A1    Jul. 10, 2008

(30) Foreign Application Priority Data

Mar. 17, 2004 (JP) ............................. 2004-076051
Aug. 24, 2004 (JP) ............................. 2004-243529

(51) Int. Cl.
*G02B 6/12* (2006.01)
*G02B 5/32* (2006.01)
*G03H 1/04* (2006.01)

(52) U.S. Cl. ............................. 349/106; 359/3; 359/15; 430/2

(58) Field of Classification Search ....................... None
See application file for complete search history.

(56) References Cited

U.S. PATENT DOCUMENTS 5,190,807 A * 3/1993 Kimock et al. .............. 428/216

(Continued)

FOREIGN PATENT DOCUMENTS

JP          62-217245          9/1987

(Continued)

OTHER PUBLICATIONS

Tsuyoshi Hotta, "Holographic Optical Elements for Liquid Crystal Projectors," ITE Technical Report vol. 20, No. 60, pp. 69-72, Nov. 1996.

*Primary Examiner*—Tina M Wong
(74) *Attorney, Agent, or Firm*—Venable LLP; Michael A. Sartori; Justine A. Gozzi (57) ABSTRACT

A hologram color filter diffraction-separates an incident lightwave using a hologram to project thus separated lightwaves having different-wavelengths at intended positions with a specified spatial period. The hologram color filter comprises a light-transmitting substrate (21) and a light-transmitting diamond-like-carbon (DLC) film (22) formed on the substrate. In the DLC film, a relatively-low-refractive-index belt-shaped region ($n_1$, 22a) and a relatively-high-refractive-index belt-shaped region ($n_2$, 22b) are placed alternately.

19 Claims, 8 Drawing Sheets

U.S. PATENT DOCUMENTS

| | | | |
|---|---|---|---|
| 6,813,076 B2 * | 11/2004 | Okubo et al. | 359/484 |
| 6,894,840 B2 * | 5/2005 | Yamanaka et al. | 359/619 |
| 6,992,832 B2 * | 1/2006 | Yamanaka et al. | 359/619 |
| 2007/0103783 A1 * | 5/2007 | Okubo et al. | 359/586 |

FOREIGN PATENT DOCUMENTS

| | | |
|---|---|---|
| JP | 10-096807 | 4/1998 |
| JP | 2000-235179 | 8/2000 |
| JP | 2002-006140 | 1/2002 |

* cited by examiner

HOLOGRAM COLOR FILTER, METHOD FOR FABRICATING THE SAME, AND COLOR LIQUID CRYSTAL DISPLAY COMPRISING IT

TECHNICAL FIELD

The present invention relates to a hologram color filter and a color liquid-crystal-display unit incorporating the filter, in particular, a hologram color filter having at least one of a light-separating function and a microlens function and an improvement of a color liquid-crystal-display unit incorporating the filter.

BACKGROUND ART

In recent years, various types of color liquid-crystal-display units have been put in practical use. As one of these color liquid-crystal-display units, a color liquid crystal projector is used. The color liquid crystal projector has many types, and each of them incorporates three liquid crystal panels. More specifically, a red-color.(R) optical image, a green-color (G) optical blue-color (B) optical image are separately displayed by the three liquid crystal panels. The three optical images having different colors are combined with a optical system to project on a screen as a full-color image.

Such a three-panel-type color liquid crystal projector requires not only three expensive liquid crystal panels but also a large number of optical components to separate a lightwave or combine three lightwaves having different colors. In other words, the three-panel-type color liquid crystal projector is not only high-cost but also difficult to be miniaturized.

On the other hand, a single-panel-type color liquid crystal projector enables cost reduction and miniaturization. An example of a single-panel-type color liquid crystal projector put into a practical use is a rear-projection television (HV-D50LA1) produced by Victor Company of Japan, Limited.

Figure 9:
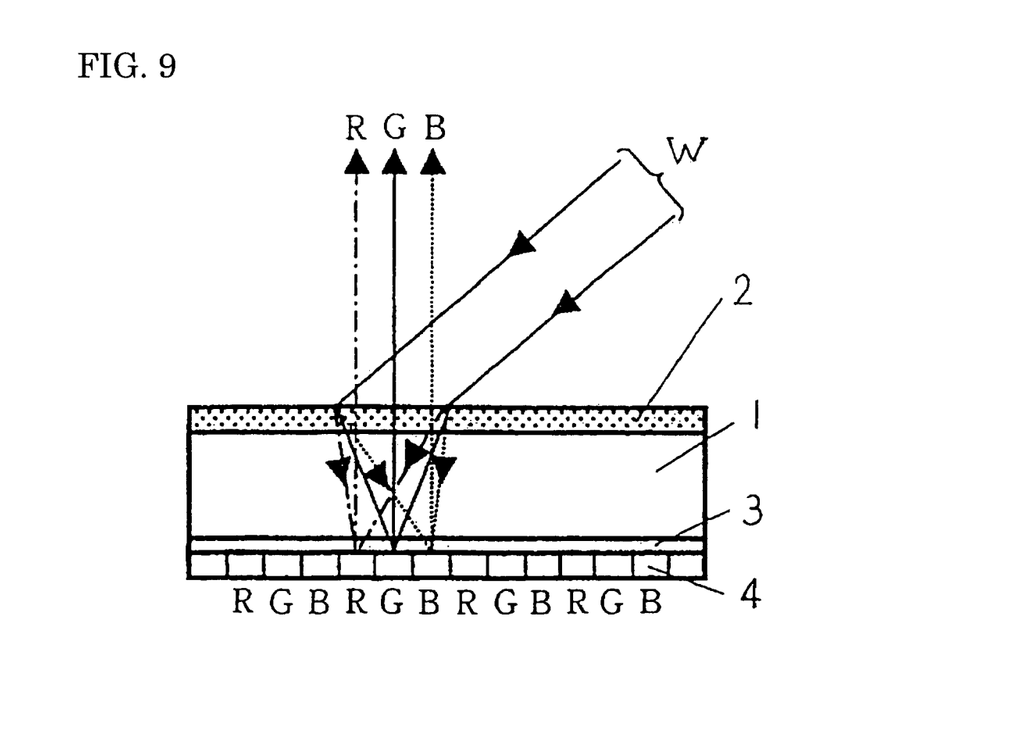
FIG. 9 is a schematic cross section illustrating the basic optical principle employed in a single-panel-type color liquid crystal projector according to a prior art.

FIG. 9 is a schematic cross section showing the basic optical principle employed in the single-panel-type color liquid crystal projector incorporated into HV-D50LA1 of Victor Company of Japan, Limited. The color liquid crystal projector has a hologram color filter, which is shown as a hologram film 2 formed on the upper surface of a glass substrate 1. A liquid crystal layer 3 is provided on the back face of the glass substrate 1. A reflection-type electrode layer 4 is provided on the back face of the liquid crystal layer 3. The reflection-type electrode layer 4 has reflection-type pixel electrodes each for reflecting an R, G, or B lightwave. A combination of R, G, and B reflection-type electrodes composes a single pixel. In FIG. 9, a plurality of R electrodes are arranged in a direction orthogonal to the drawing. Similarly, a plurality of G electrodes and a plurality of B electrodes are both arranged in a direction orthogonal to the drawing. In addition, a transparent electrode (not shown) is provided between the glass substrate 1 and the liquid crystal layer 3 as a counter electrode to the R, G, and B electrodes.

In the color liquid crystal projector shown in FIG. 9, a white lightwave, W, emitted from a light source (not shown) enters the hologram film 2 at a specified incident angle. The hologram film 2 by its diffraction function separates the white lightwave, W, into a red-color (R) lightwave, green-color (G) lightwave, and blue-color (B) lightwave according to their wavelengths (separation of a lightwave into its spectral components). The hologram film 2 also has a function as a microlens array for gathering the three types of lightwaves onto the corresponding R, G, and B electrodes. In this case, the red-color (R), green-color (G), and blue-color (B) lightwaves reflected from the R, G, and B electrodes, respectively, are displaced from one another according to the diffraction condition of the hologram film 2. The displaced three types of lightwaves pass through the hologram film 2 to be projected onto a screen by a projection lens (not shown).

Figure 10:
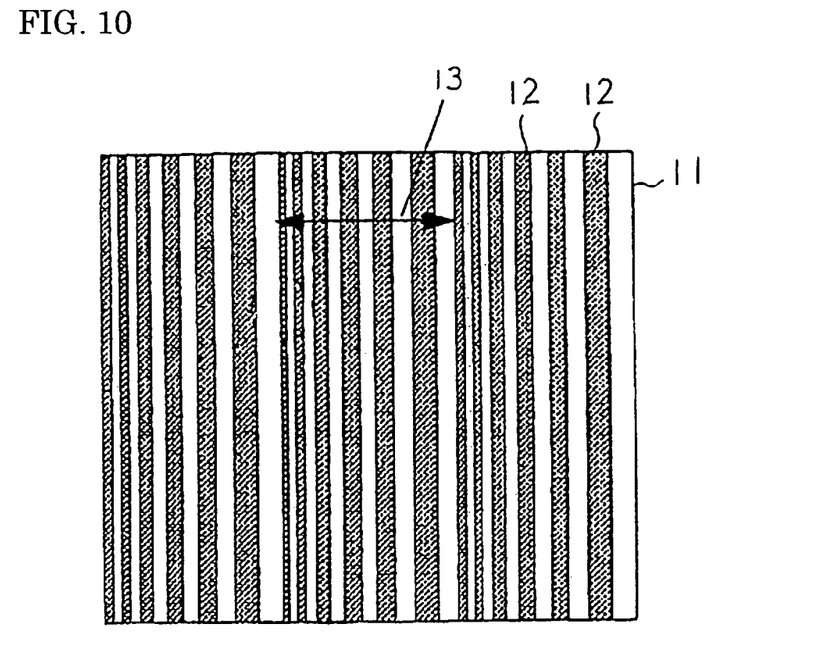
FIG. 10 is a schematic plan view showing an example of a diffraction grating having both a wavelength-separating function and a microlens function.

FIG. 10 is a schematic plan view showing an example of a hologram (diffraction grating) having both a light-separating function and a microlens array function. The diffraction grating has a grating pattern formed on a glass substrate 11. The grating pattern has a plurality of belt-shaped regions 12 parallel to one another. The belt-shaped regions 12 may be formed with metallic chromium (Cr) films, for example. Of course, the Cr films 12 do not transmit a lightwave, and a lightwave passes only through the spacing between the multiple belt-shaped Cr films 12.

In other words, the multiple parallel belt-shaped Cr-film regions 12 act as a diffraction grating, and the lightwave is diffracted in a direction orthogonal to the longitudinal direction of the belt-shaped Cr-films 12. At this moment, as is well known, because the diffraction angle has wavelength dependence, the R, G, and B lightwaves are diffracted with diffraction angles different with one another. Thus, the white-color lightwave, W, can be color-separated.

Furthermore, the diffraction grating shown in FIG. 10 has a special feature in that the width and spacing of the belt-shaped Cr-film regions 12 are periodically varied. This arrangement is performed to give the diffraction grating a microlens array function. More specifically, when the wavelength is the same, as is well known, as the spacing of the diffraction grating decreases, the diffraction angle increases. Therefore, by gradually varying the spacing of the diffraction grating, the lens function can be produced.

In addition, in the diffraction grating shown in FIG. 10, as described above, the lightwave is diffracted only in a direction orthogonal to the longitudinal direction of the belt-shaped Cr-films 12. Therefore, the lens function is produced only in that direction. As a result, the diffraction grating acts as a columnar lens having a linear focus. However, if required, by utilizing a diffraction grating similar to the well-known Fresnel's zone plate, it is possible to produce a function of a circular or square lens having a point focus, as a matter of course.

The diffraction grating shown in FIG. 10 acts as if it has a plurality of columnar microlenses parallel to one another. The region indicated by an arrow 13 acts as a single columnar microlens. In the columnar microlens region 13, as the position moves from the right to the left, the width and spacing of the belt-shaped Cr films 12 are decreased. In other words, in the diffraction grating shown in FIG. 10, the width and spacing of the belt-shaped Cr films 12 are periodically varied for every columnar microlens region 13.

When the diffraction grating as shown in FIG. 10 is used without modification in place of the hologram film 2 in the color liquid crystal projector shown in FIG. 9, because the belt-shaped Cr-films 12 do not transmit a lightwave, the utilization efficiency of the white-color lightwave, W, from the light source is decreased. In addition, in the diffraction grating shown in FIG. 10, the pitch of the belt-shaped Cr-film regions 12 is remarkably small. For example, at the center portion of the region 13, the pitch is at most 0.5 μm or so. Consequently, the diffraction grating as shown in FIG. 10 must be formed by using the electron-beam drawing, which is unsuitable for the industrial mass production.

To solve this problem, in the color liquid crystal projector shown in FIG. 9, light is applied to a photopolymer film on the glass substrate through a master diffraction grating. Then, the light-irradiated photopolymer film is heat-treated to produce the hologram film 2. At this moment, as the intensity of the light applied to a region is increased, the refractive index "n" of the region is increased. In other words, the hologram film 2 made of a photopolymer has a modulated refractive index, "n," and acts as a refractive-index-modulated-type diffraction grating.

Figure 11:
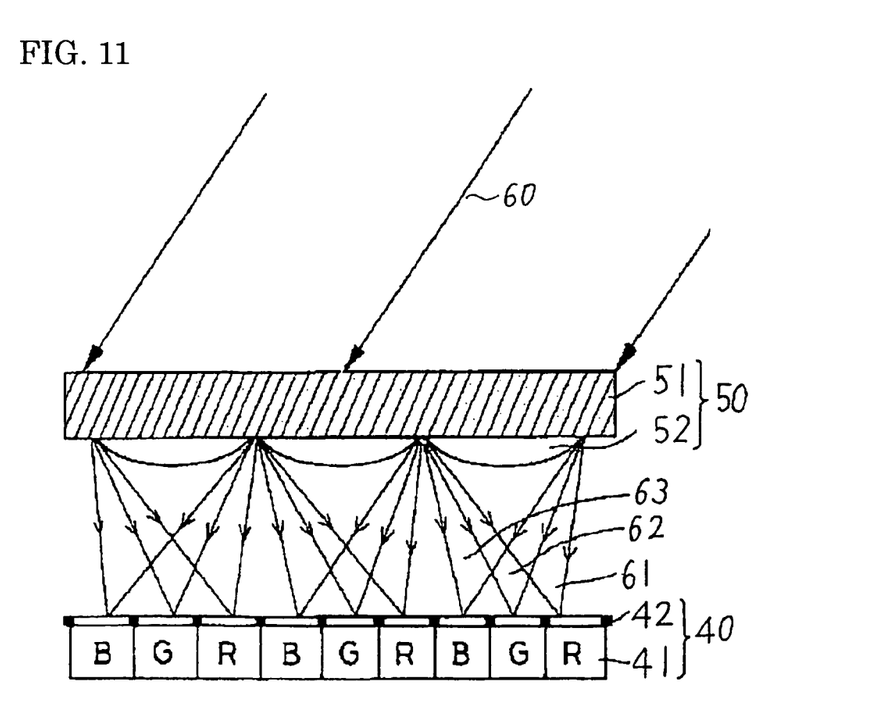
FIG. 11 is a schematic cross section illustrating a color liquid-crystal-display unit according to a prior art.

FIG. 11 is a schematic cross section illustrating a color liquid-crystal-display unit disclosed in the patent literature 1, which is the published Japanese patent application Tokukaihei 10-96807. The color liquid-crystal-display unit has a well-known light-transmitting-type liquid crystal panel 40. The liquid crystal panel 40 has a liquid crystal displaying layer 41 and a black matrix 42. The liquid crystal displaying layer 41 has a plurality of pixels, and each pixel has a single combination of a red-color-displaying region R, a green-color-displaying region G, and a blue-color-displaying region B. The boundaries between the individual color-displaying regions are covered with the black matrix 42.

A hologram color filter 50 is placed at the rear-face side of the liquid crystal panel 40. The hologram color filter 50 has a hologram plate 51 and an array of a plurality of microlenses 52. The individual microlenses 52 are arranged in an array with a period corresponding to that of the pixels in the liquid crystal panel 40. The hologram plate 51 is formed with a silica-glass plate that has parallel and uniform grooves and that functions as a diffraction grating.

In the color liquid-crystal-display unit shown in FIG. 11, when a back lightwave 60 is introduced into the hologram color filter 50, the lightwave 60 is diffracted at different angles according to the wavelengths to perform wavelength separation. Then, a red-color lightwave 61, a green-color lightwave 62, and a blue-color lightwave 63 emerge from the exit side of the hologram plate 51. The microlens 52 placed next to the hologram plate 51 gathers these wavelength-separated lightwaves on their focal planes by separating the lightwaves according to their wavelengths. More specifically, the color filter 50 is arranged such that the red-color lightwave 61 is diffracted to gather at the red-color-displaying region, R, in the pixel, the green-color lightwave 62 at the green-color-displaying region, G, and the blue-color lightwave 63 at the blue-color-displaying region, B. This arrangement enables the individual lightwaves each having a specific color component to pass through the liquid crystal cells almost without being attenuated at the black matrix 42. Thus, the color display of the individual liquid crystal cells can be performed.

In such a color liquid-crystal-display unit, as the hologram plate 51, a light-transmitting-type hologram plate is used that has no light-gathering property and has less wavelength dependence of the diffraction efficiency. Consequently, it is not necessary to align the hologram plate 51 with the arranging period of the microlenses 52. Furthermore, unlike the case where a single microlens is placed corresponding to each of the color-displaying regions, a single microlens 52 is placed corresponding to each pixel, increasing the arranging period threefold. As a result, the microlens array becomes easy to produce and arrange.

Figure 12:
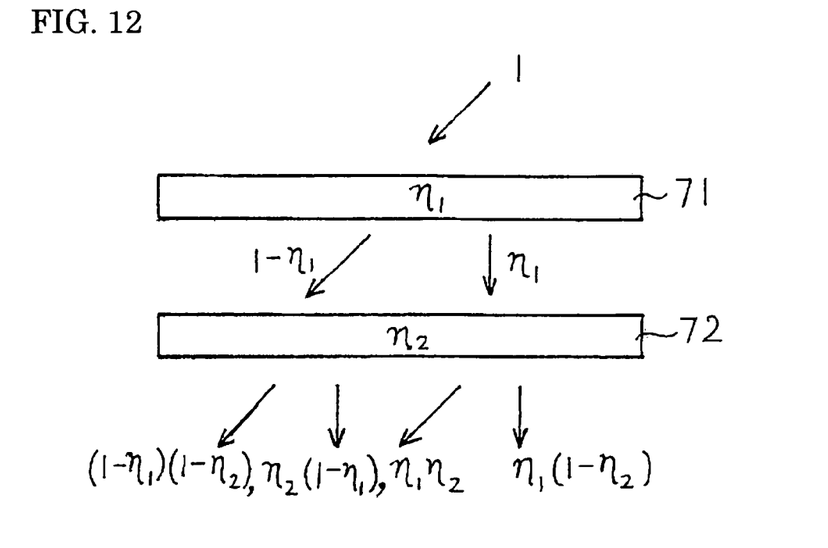
FIG. 12 is a schematic cross section illustrating a hologram color filter according to a prior art.

FIG. 12 is a schematic cross section illustrating a hologram color filter disclosed in the non-patent literature 1, which is ITE Technical Report Vol. 20, 1996, pp. 69-72. The hologram color filter has two hologram films 71 and 72 in order to improve the intensity balance between the red-color, green-color, and blue-color lightwaves.

In general, in a hologram film, there exists a wavelength of a lightwave that is most easily diffracted by the hologram film. More specifically, a hologram film has the highest diffraction efficiency for a lightwave having a specific wavelength. As the wavelength difference from the specific wavelength increases, the diffraction efficiency tends to decrease.

In particular, in the case where the refractive-index difference, $\Delta n$, is small in a refractive-index-modulated-type hologram film, this wavelength dependence of the diffraction efficiency tends to be remarkable. For example, as in a photopolymer hologram film, when the refractive-index difference, $\Delta n$, is as small as at most 0.04, it is difficult to obtain a hologram film that has a small wavelength dependence of the diffraction efficiency.

Consequently, in the case where a hologram film wavelength-separates a white-color lightwave into a red-color lightwave, green-color lightwave, and blue-color lightwave, the hologram film is designed such that the highest diffraction efficiency can be achieved for the green-color lightwave, which lies in an intermediate wavelength range among the red-color, green-color, and blue-color lightwaves. A hologram film designed by the above-described principle has a lower diffraction efficiency for the red-color and blue-color lightwaves than for the green-color lightwave. Consequently, the red-color and blue-color lightwaves that are wavelength-separated by the hologram film have a lower intensity than that of the green-color lightwave. As a result, even when the wavelength-separated red-color, green-color, and blue-color lightwaves are recombined with the intention of achieving a white-color lightwave, the recombined lightwave tends to be a greenish white-color lightwave.

In addition, a halide lamp and a superhigh-pressure mercury lamp to be used as a back light for a color liquid-crystal-display unit include an intense emission line in a wavelength range of the green-color lightwave. Therefore, when the lightwave from a halide lamp or a superhigh-pressure mercury lamp is wavelength-separated by a hologram film designed to have the highest diffraction efficiency for the green-color lightwave, the intensity of the green-color lightwave tends to be most remarkable among the wavelength-separated red-color, green-color, and blue-color lightwaves.

The hologram color filter shown in FIG. 12 has two hologram films 71 and 72 in order to decrease the non-uniformity in the above-described wavelength-dependent diffraction efficiency so that the color balance of the color liquid-crystal-display unit can be improved. The first hologram film 71 has a diffraction efficiency of $\eta_1$ for the lightwave having a specific wavelength of $\lambda$, and the second hologram film 72 has a diffraction efficiency of $\eta_2$ or the lightwave having the same specific wavelength of $\lambda$. Here, the diffraction efficiency is assumed to take a value of 1 when the entire incident lightwave is diffracted and a value of 0 when the entire incident lightwave is transmitted without being diffracted.

When the incident lightwave of the intensity 1 having a specific wavelength of $\lambda$ passes through the first hologram film 71, the intensity ratio of the transmitted lightwave to the diffracted lightwave is $(1-\eta_1):\eta_1$. When the transmitted lightwave having passed through the first hologram film 71 passes through the second hologram film 72, the intensity ratio of the transmitted lightwave (parallel to the direction of the original incident lightwave) to the diffracted lightwave (parallel to the direction of the diffraction by the first hologram film 71) is $(1-\eta_1)(1-\eta_2):\eta_2(1-\eta_1)$. When the diffracted lightwave having passed through the first hologram film 71 passes through the second hologram film 72, the intensity ratio of the diffracted lightwave (parallel to the direction of the original incident lightwave) to the transmitted lightwave (parallel to the direction of the diffraction by the first hologram film 71) is $\eta_1\eta_2:\eta_1(1-\eta_2)$. Consequently, the lightwave having passed through the two hologram films 71 and 72 and being in the direction of the diffraction has an intensity of $\eta_2(1-\eta_1)+\eta_1(1-\eta_2)=\eta_1+\eta_2-2\eta_1\eta_2$.

Figure 13:
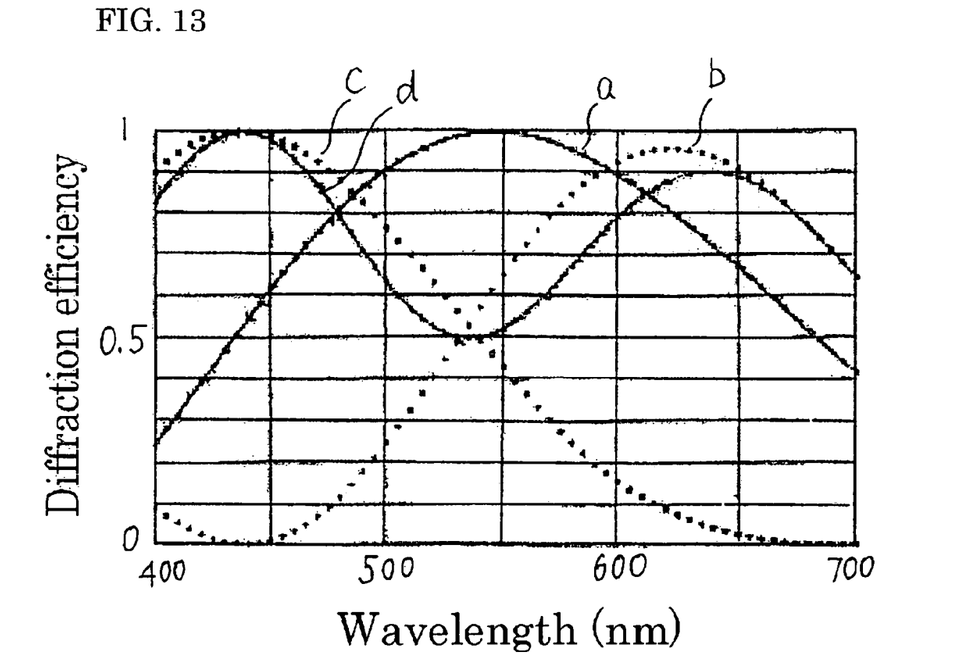
FIG. 13 is a graph schematically showing the wavelength dependence of the diffraction efficiency in the hologram color filter shown in FIG. 12.

FIG. 13 shows an example of the result of a computer simulation on the hologram color filter having two hologram films as shown in FIG. 12. In the graph in FIG. 13, the horizontal axis represents the wavelength (nm) of the lightwave, and the vertical axis the diffraction efficiency of the hologram film.

A curve "a" shows an example of the diffraction efficiency of a hologram color filter made of a single hologram film. The single hologram film "a" is designed such that the highest diffraction efficiency can be achieved for the green-color lightwave, which has an intermediate wavelength between the red-color and blue-color lightwaves. Consequently, after a white-color lightwave is wavelength-separated by the hologram film "a," the red-color and blue-color lightwaves tend to have a lower intensity than that of the green-color lightwave.

On the other hand, the hologram film "b" is designed such that the highest diffraction efficiency can be achieved for the red-color lightwave, and the hologram film "c" is designed such that the highest diffraction efficiency can be achieved for the blue-color lightwave. As a result, the hologram color filter having the two hologram films "b" and "c" has a combined diffraction efficiency as shown by a curve "d." In other words, the hologram color filter "d" has a higher diffraction efficiency for the red-color and blue-color lightwaves than for the green-color lightwave. Because it has two peaks of diffraction efficiency, it is sometimes called a two-peak hologram color filter.

Figure 14:
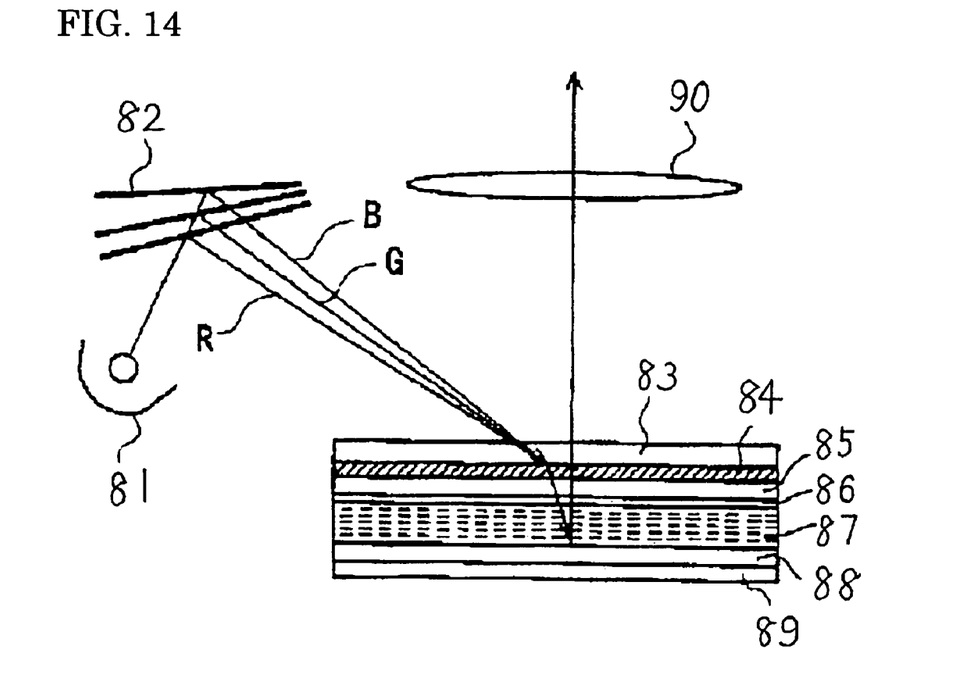
FIG. 14 is a schematic cross section illustrating a color liquid crystal projector according to a prior art.

FIG. 14 is a schematic cross section illustrating a color liquid crystal projector disclosed in the patent literature 2, which is the published Japanese patent application Tokukai 2000-235179. This color liquid-crystal-display unit comprises a white-color light source 81, three dichroic mirrors 82, a glass substrate 83, a hologram lens layer 84 made of a photopolymer, a thin-plate glass layer 85, a transparent electrode 86, a liquid crystal layer 87, a pixel electrode 88, an active-matrix-driving circuit 89, and a projecting lens 90.

In the color liquid crystal projector shown in FIG. 14, a white-color lightwave emitted from the white-color light source 81 is wavelength-separated into three primary color lightwaves (R, G, and B) by the three dichroic mirrors 82. The wavelength-separated R, G, and B lightwaves are projected onto the hologram lens layer 84 with incident angles different from one another such that each of them can be gathered at the highest diffraction efficiency.

Patent literature 1: the published Japanese patent application Tokukaihei 10-96807.

Patent literature 2: the published Japanese patent application Tokukai 2000-235179.

Non-patent literature 1: ITE Technical Report Vol. 20, 1996, pp. 69-72.

DISCLOSURE OF THE INVENTION

Problems to be Solved by the Invention

In the above-described hologram film made of a photopolymer, the refractive-index difference $\Delta n$ that can be increased by light irradiation is limited to about 0.04. As is well known, in a refractive-index-modulated-type diffraction grating, as the refractive-index difference $\Delta n$ is increased, the diffraction efficiency (utilization efficiency of light) can be increased. In addition, as the refractive-index difference $\Delta n$ is increased, the wavelength dependence of the diffraction efficiency can be decreased. In the above description, the refractive-index difference $\Delta n$ of about 0.04 cannot be said sufficient, because it is difficult to increase the diffraction efficiency of the hologram film made of a photopolymer.

In addition, in recent years, the color liquid crystal projector has been required to increase its brightness. Consequently, optical components used in the projector are required to have a resistance to heat against at least 80 to 100° C. or so. However, it cannot be said that the photopolymer has sufficient resistance to heat. When the photopolymer is subjected to a repeated heat history between room temperature and a temperature of about 100° C., the photopolymer hologram film itself may deteriorate or it may be separated from the glass substrate.

Furthermore, as disclosed in the patent literature 1, the silica-glass hologram plate having a plurality of tiny grooves must be produced by performing electron lithography and etching for each plate, which is unsuitable for industrial mass production.

In view of the above-described situation in the prior art, an object of the present invention is to improve the light utilization efficiency and resistance to heat of a hologram color filter having at least one of a light-separating function and a microlens function. Another object of the present invention is to offer a color liquid-crystal-display unit that has high brightness and that is improved in color balance.

Means to Solve the Problem

In accordance with an aspect of the present invention, a hologram color filter has a function of a color filter that diffraction-separates an incident lightwave using a hologram to project thus separated lightwaves having different wavelengths at intended positions with a specified spatial period. The hologram color filter comprises a light-transmitting substrate and a light-transmitting diamond-like-carbon (DLC) film formed on the substrate. In the DLC film, a relatively-high-refractive-index belt-shaped region and a relatively-low-refractive-index belt-shaped region are placed alternately.

In the hologram color filter comprising the DLC film, the variation in diffraction efficiency with respect to the incident lightwave may be at most 40% in a wavelength range from a wavelength of 470 nm in the blue-color-light region to a wavelength of 630 nm in the red-color-light region. In addition, the hologram color filter may be capable of creating a mutual difference of at least 30% in diffraction efficiency with respect to an s-polarized lightwave and a p-polarized lightwave in a wavelength range from a wavelength of 470 nm in the blue-color-light region to a wavelength of 630 nm in the red-color-light region.

In addition, the DLC film may be combined with a microlens array. In this case, in the DLC film, the width and spacing of the high-refractive-index belt-shaped regions may be predetermined on a fixed basis, and the microlens array may comprise a plurality of microlenses placed at a period corresponding to the specified spatial period.

In addition, in the DLC film, the width and spacing of the high-refractive-index belt-shaped regions may be varied periodically corresponding to the specified spatial period. This arrangement enables the hologram color filter to combine a light-separating function and a microlens-array function.

Furthermore, the hologram color filter may comprise a plurality of DLC films. It is desirable that each of the DLC films have a peak of diffraction efficiency for a lightwave having a wavelength different with each other. In this case, it is desirable that the hologram color filter comprise a first DLC film and a second DLC film, and the first DLC film have a peak of diffraction efficiency for a red-color lightwave and the second DLC film have a peak of diffraction efficiency for a blue-color lightwave.

It is desirable that in the DLC film, the refractive index be varied in multiple stages in the boundary region from the low-refractive-index belt-shaped region to the high-refractive-index belt-shaped region. In addition, it is more desirable that in the DLC film, the refractive index be varied continuously in the boundary region from the low-refractive-index belt-shaped region to the high-refractive-index belt-shaped region.

In a method of producing a hologram color filter as described above, the DLC film may be desirably formed by plasma CVD. In addition, the relatively-high-refractive-index regions in the DLC film may be formed by treating the DLC film with any one of the following methods: an ultraviolet-light irradiation, an x-ray irradiation, a synchrotron-radiation-light irradiation, an ion-beam irradiation, and an electron-beam irradiation. The relatively-high-refractive-index regions in the DLC film may also be formed by the exposure to ultraviolet rays having a periodical intensity distribution, the ultraviolet rays being obtained by the interference between two types of diffracted lightwaves having passed through a phase grating mask.

In accordance with another aspect of the present invention, a color liquid-crystal-display unit comprises a hologram color filter as described above and a liquid crystal panel coupled with the hologram color filter. In the hologram color filter, the spatial period in a color filter function corresponds to the period of a plurality of pixels included in the liquid crystal panel. More specifically, each of the pixels includes a red-color-displaying region, a green-color-displaying region, and a blue-color-displaying region. The hologram color filter separates the incident lightwave into a red-color lightwave, a green-color lightwave, and a blue-color lightwave to project them to the red-color-displaying region, the green-color-displaying region, and the blue-color-displaying region, respectively. The types of light source for a color liquid-crystal-display unit may include a halide lamp, a superhigh-pressure mercury lamp, a cold cathode-ray tube, a xenon lamp, a light-emitting diode (LED), a semiconductor laser (LD), an Ar laser, an He—Ne laser, a YAG laser, and the like.

In accordance with yet another aspect of the present invention, a color liquid-crystal-display unit comprises:
(a) a plurality of semiconductor light-emitting devices for emitting a blue-color lightwave, a green-color lightwave, and a red-color lightwave individually;
(b) a hologram color filter comprising a DLC film having a microlens-array function; and
(c) a liquid crystal panel comprising a plurality of pixels arranged with a specific spatial period.

In the DLC film, a relatively-high-refractive-index belt-shaped region and a relatively-low-refractive-index belt-shaped region are formed alternately, and the width and spacing of the high-refractive-index belt-shaped regions are varied periodically corresponding to the spatial period of the pixels.

In a method of producing the color liquid-crystal-display unit, it is desirable that the relatively-high-refractive-index regions in the DLC film be formed by the exposure to ultraviolet rays having a periodical intensity distribution, the ultraviolet rays being obtained by the interference between two types of diffracted lightwaves having passed through a phase grating mask.

Advantageous Effect of the Invention

The present invention uses a DLC film that can create large refractive-index variation and that has excellent resistance to heat to produce a hologram color filter having at least one of a light-separating function and a microlens function. Therefore, the produced hologram color filter can not only increase the utilization efficiency of light but also have significantly improved resistance to heat. The use of the improved hologram color filter enables the offering of a color liquid-crystal-display unit having high brightness and improved color balance.

EXPLANATION OF REFERENCED NUMERALS

1: glass substrate, 2: hologram film, 3: liquid crystal layer, 4: reflection-type electrode layer, 11: glass substrate, 12: Cr-film diffraction grating, 13: single microlens region, 21: silica-glass substrate, 22: DLC film, 22a: low-refractive-index region, 22b: high-refractive-index region, 22c: boundary region, 23a, 23b: silica-glass substrate, 24a, 24b: gold mask, 24c: diffraction grating, 25a, 25b: UV-light beams, 25c: KrF laser-light beams, 26: spacer, 34: gold mask, 35: He-ion beams, 40: liquid crystal panel, 41: liquid crystal displaying layer, 42: black matrix, 50: hologram color filter, 51: hologram plate, 52: microlens, 60: back lightwave, 61: red-color lightwave, 62: green-color light wave, 63: blue-color lightwave, 71: first hologram film, 72: second hologram film, "a": hologram film having the highest diffraction efficiency for the green-color lightwave, "b": hologram film having the highest diffraction efficiency for the red-color lightwave, "c": hologram film having the highest diffraction efficiency for the blue-color lightwave, "d": hologram color filter having a peak of diffraction efficiency for the red-color lightwave and blue-color lightwave, 81: white-color light source, 82: dichroic mirror, 83: glass substrate, 84, 84a: hologram lens layer, 85: thin-plate glass layer, 86: transparent electrode, 87: liquid crystal layer, 88: pixel electrode, 89: active-matrix-driving circuit, 90: projecting lens, 91B: blue-color-light-emitting device, 91G: green-color-light-emitting device, and 91R: red-color-light-emitting device.

BEST MODE FOR CARRYING OUT THE INVENTION

First of all, in achieving the present invention, the present inventors confirmed that the application of an energy beam onto a light-transmitting DLC film can increase its refractive index. Such a DLC film can be formed on a glass substrate, a polymer substrate, and other various light-transmitting substrates by the plasma chemical vapor deposition (CVD). The light-transmitting DLC film obtained by the plasma CVD usually has a refractive index of about 1.55.

As the energy beam for increasing the refractive index of the DLC film, an ion beam, a synchrotron radiation (SR) lightwave, an electron beam, and the like can be used. For example, when an He ion is implanted with a dose of $5\times10^{17} cm^2$ at an acceleration voltage of 800 keV, the amount of refractive-index variation, $\Delta n$, can be increased to about 0.65. The ion implantation using H, Li, B, C, or the like can also similarly modulate the refractive index. In addition, the application of an SR lightwave having a spectrum of 0.1 to 130 nm can also increase the amount of refractive-index variation, $\Delta n$, to about 0.65 at the maximum. Furthermore, in UV-light irradiation, when a KrF excimer laser light beam having a wavelength of 248 nm, for example, is applied in pulses at a cycle rate of 100 Hz with an irradiation density of 160 $\mu W/mm^2$ per pulse, the amount of refractive-index variation, $\Delta n$, can be increased to about 0.22. When an excimer laser light beam using ArF (193 nm), XeCl (308 nm), XeF (351 nm), or the like or an Ar laser light beam (488 nm) is applied, the refractive index can be similarly modulated. It is found that these amounts of refractive-index variation of the DLC film by the energy-beam irradiation shows an order-of-magnitude increase over the amount of refractive-index variation ($\Delta n$ is at most 0.04 or so) by the conventional light-beam irradiation of a photopolymer film.

Figure 1:
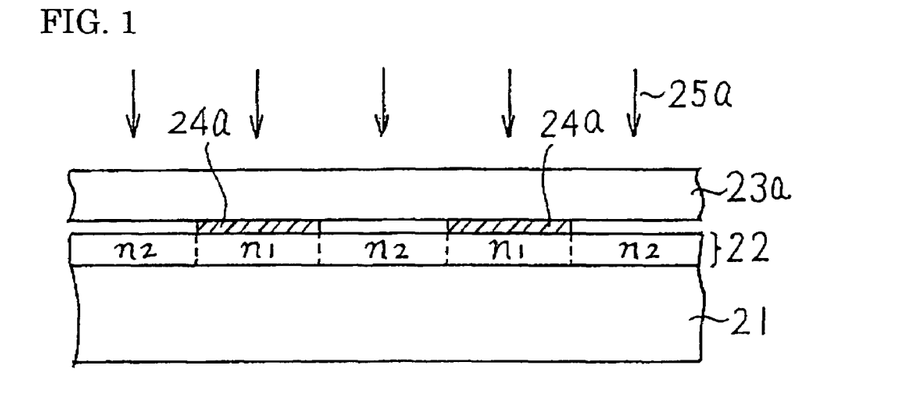
FIG. 1 is a schematic cross section illustrating the method of producing a DLC hologram film in an embodiment of the present invention.

FIG. 1 illustrates by using a schematic cross section the method of producing a hologram film using a DLC film employed in an embodiment of the present invention. Such a DLC hologram film can be desirably used in place of any of the following hologram films: (a) the photopolymer hologram film 2 used in the color liquid crystal projector shown in FIG. 9, (b) the silica-glass hologram plate 51 used in the color liquid-crystal-display unit shown in FIG. 11, (c) the photopolymer hologram films 71 and 72 shown in FIG. 12, and (d) the photopolymer hologram film 84 used in the color liquid crystal projector shown in FIG. 14.

In the production method of the DLC hologram film shown in FIG. 1, a DLC hologram film 22 is formed, for example, on a silica ($SiO_2$)-glass substrate 21 by plasma CVD. Then, a mask 24a formed on another silica-glass substrate 23a is placed over the DLC hologram film 22. The mask 24a may be formed by using various materials. Nevertheless, it is desirable to use a gold (Au) film, because gold is easy to process with high precision, is superior in blocking an energy beam, and do not create problems due to oxidation and corrosion. The gold mask 24a can be produced by the following procedure, for example.

First, a gold film having a thickness of about 0.5 μm is deposited on a glass substrate by the well-known spattering method or electron beam (EB) vapor deposition method. A resist layer is applied on the gold film. The resist layer is formed into a pattern by using the stepper exposure method. The gold film is formed into a pattern by performing dry etching through the resist pattern. By removing the resist pattern, the gold mask pattern can be obtained.

In another method for replacing the above-described method, first, an Ni conductive layer having a thickness of at most about 50 nm is deposited on a glass substrate by the spattering method or EB vapor deposition method. A resist pattern is formed on the Ni conductive layer. A gold film having a thickness of about 0.5 μm is deposited on the Ni layer by electroplating through the resist pattern. By removing the resist pattern, the gold mask can be formed.

The gold mask formed by either of the above-described methods has a pattern corresponding to the pattern of the diffraction grating for the hologram function. In FIG. 1, for the simplicity and clarification of the drawing, the width and spacing of the belt-shaped gold film 24a are shown on a fixed basis.

As shown in FIG. 1, under the condition that the gold-film mask 24a is placed over the DLC film 22, the DLC film 22 is irradiated with UV-light beams 25a from above. As a result, in the DLC film 22, the region covered by the gold mask 24a and unirradiated with the UV-light beams 25a experiences no variation in the refractive index. In other words, the region maintains the refractive index $n_1$ given at the time of the deposition by the plasma CVD. On the other hand, in the DLC film 22, the region not covered by the gold mask 24a and irradiated with the UV-light beams 25a experiences variation in the refractive index. Consequently, the refractive index is increased to $n_2$. After the UV-light beam irradiation is performed, the silica-glass substrate 23a and the gold mask 24a are removed from the DLC hologram film 22. The thus obtained DLC hologram film 22 has two values of refractive index, $n_1$ and $n_2$. As a result, it functions as a two-level refractive-index-modulated-type diffraction grating.

Here, the DLC hologram film 22 shown in FIG. 1 is compared below with the diffraction grating shown in FIG. 10. In the diffraction grating shown in FIG. 10, the lightwave blocked by the Cr film 12 cannot be used as the diffracted lightwave, decreasing the utilization efficiency of light. On the other hand, in the DLC hologram film 22 shown in FIG. 1, both the lightwave passing through the region having a low refractive index of $n_1$ and the lightwave passing through the region having a high refractive index of $n_2$ can be used as the diffracted lightwave, increasing the utilization efficiency of light.

On the other hand, the photopolymer hologram films 2, 71, 72, and 84 shown in FIGS. 9, 12, and 14 are similar to the DLC hologram film 22 shown in FIG. 1 in functioning as a refractive-index-modulated-type diffraction grating having both a low-refractive-index region and a high-refractive-index region. Consequently, in the photopolymer hologram film, also, both the lightwave passing through the low-refractive-index region and the lightwave passing through the high-refractive-index region can be used as the diffracted lightwave. However, as described above, the refractive-index difference, $\Delta n$, achievable by the light irradiation of the photopolymer film is at most 0.04 or so. In contrast, the refractive-index difference, Δn, achievable by the UV-light irradiation of the DLC film is about 0.2. Therefore, the DLC hologram film 22 shown in FIG. 1 can achieve a much higher diffraction efficiency than that of the photopolymer hologram film, increasing the utilization efficiency of light. Furthermore, a DLC hologram film capable of increasing the refractive-index difference, Δn, can decrease the wavelength dependence of the diffraction efficiency.

Figure 2:
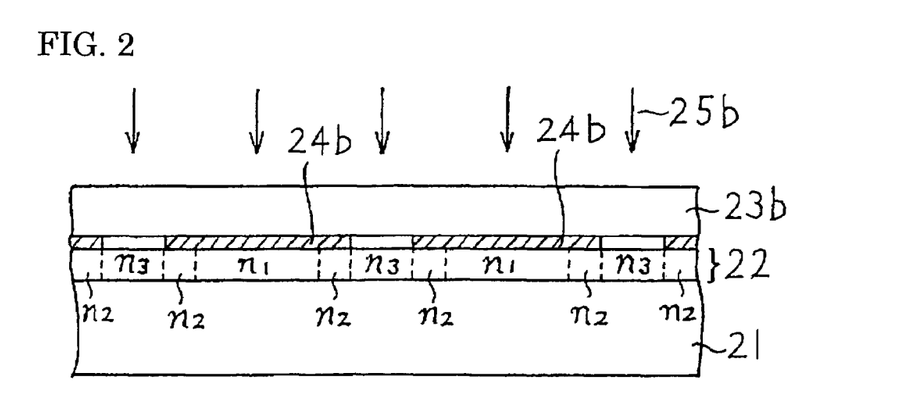
FIG. 2 is a schematic cross section illustrating the method of producing a DLC hologram film in another embodiment of the present invention.

FIG. 2 illustrates by using a schematic cross section the method of producing a hologram film using a DLC film employed in another embodiment of the present invention. In FIG. 2, first, a DLC hologram film 22 having a two-level refractive-index modulation (i.e., $n_1$ and $n_2$) is formed by a method similar to that shown in FIG. 1. Next, a second gold mask 24b on another silica-glass substrate 23b is placed over the DLC hologram film 22. Then, under this condition, a second irradiation is performed using UV-light beams 25b.

In this case, the second gold mask 24b has openings for applying UV light beams only to regions selected in the regions having a high refractive index, $n_2$, in the DLC hologram film formed by the process shown in FIG. 1. Consequently, after the irradiation with the UV-light beams 25b, the refractive index in the selected regions in the regions having a relatively high refractive index, $n_2$, is increased to a higher value of $n_3$. As a result, the DLC hologram film 22 produced as shown in FIG. 2 functions as a diffraction grating having a three-level refractive-index modulation (i.e., $n_1$, $n_2$, and $n_3$).

As described above, by repeating the N-light irradiation of the DLC film by using a mask having a partially modified pattern in turn, a DLC hologram film having an intended more-than-two-level refractive-index modulation can be obtained. As is well known, a more-than-two-level refractive-index-modulated-type diffraction grating can have a higher diffraction efficiency than that of a two-level refractive-index-modulated-type diffraction grating, further improving the utilization efficiency of light.

Figure 3:
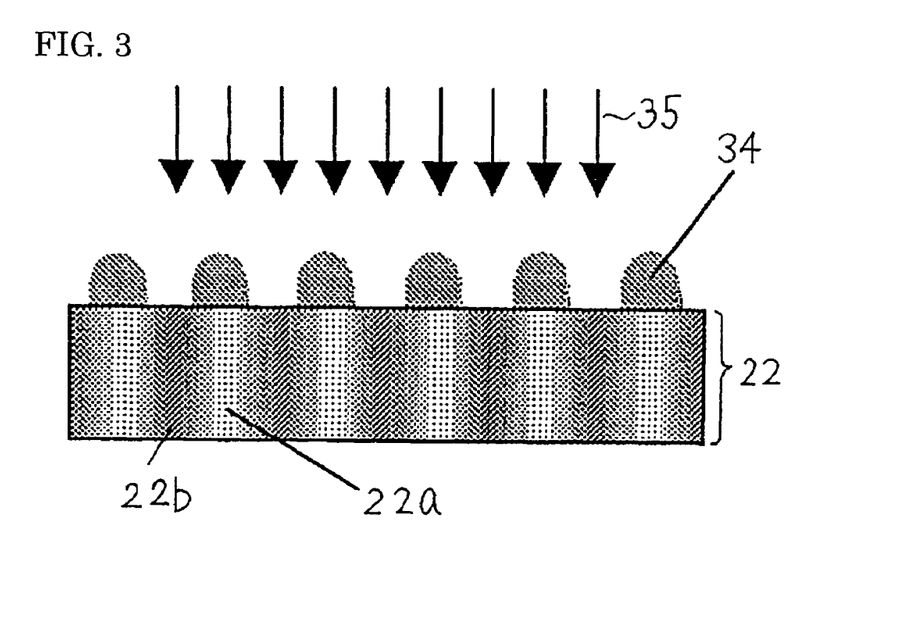
FIG. 3 is a schematic cross section illustrating the method of producing a DLC hologram film in yet another embodiment of the present invention.

FIG. 3 illustrates by using a schematic cross section the method of producing a hologram film using a DLC film employed in yet another embodiment of the present invention. In this production method, a gold mask 34 is formed on a DLC film 22 on a silica-glass substrate (not shown). The gold mask 34 can also be formed by electron-beam drawing such that it has a specified hologram (diffraction grating) pattern. In FIG. 3, also, for the simplicity and clarification of the drawing, the width and spacing of the belt-shaped gold films 34 are shown on a fixed basis.

Here, the belt-shaped gold films 34 have a specific feature in that the upper surface of each of them is formed as the surface of a semi-circular cylinder. Such a surface of a semi-circular cylinder can be formed by etching or nanoimprinting (mold transferring), for example.

Through the thus formed gold mask 34, the DLC film 22 is irradiated with He ions 35, for example. At this moment, because each of the belt-shaped gold films 34 has the shape of the upper surface of a semi-circular cylinder, in the vicinity of the side face of each of the belt-shaped gold films 34, some He ions can pass through the mask and penetrate into the DLC film 22. As a result, in the DLC film 22 shown in FIG. 3, the refractive index varies continuously in the vicinity of the boundary between a low-refractive-index region 22a and a high-refractive-index region 22b. After the refractive index of the DLC film is modulated by the ion-beam irradiation, the gold mask 34 can be dissolution-removed by the immersion in an intended-for-gold cyanogen-based etching liquid for about several minutes at room temperature.

As described above, in a more-than-two-level refractive-index-modulated-type diffraction grating, as the number of levels is increased, the diffraction efficiency is improved. It should be noted that a refractive-index-modulated-type diffraction grating having a continuously varied refractive index is equivalent to a diffraction grating having an infinite-level refractive-index modulation. In other words, the DLC hologram film obtained in FIG. 3 has more improved diffraction efficiency than in the case of FIG. 2. As a result, the utilization efficiency of light can be further improved.

Figure 4:
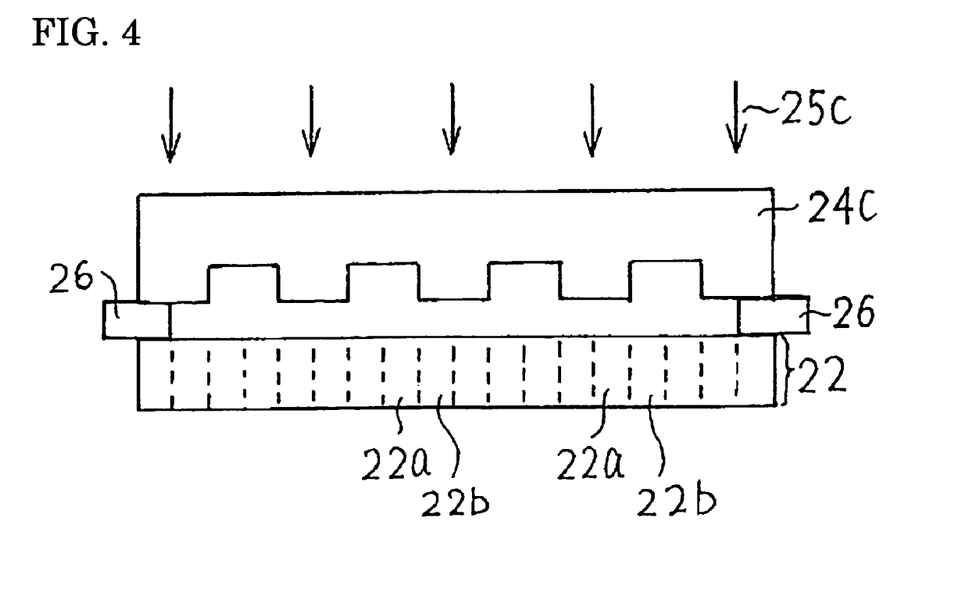
FIG. 4 is a schematic cross section illustrating the method of producing a DLC hologram film in yet another embodiment of the present invention.

FIG. 4 illustrates by using a schematic cross section the method of producing a hologram film using a DLC film employed in yet another embodiment of the present invention. In this production method, a glass relief-type phase grating mask (diffraction grating) 24c is placed adjacent to a DLC film 22 through, for example, a spacer 26 having a thickness of 100 μm. Under this condition, a hologram film can be produced by applying, for example, KrF laser-light beams (wavelength: 248 nm) 25c for one hour at an energy density of 16 mW/mm². At this moment, the refractive index is increased in regions 22b exposed to an interference lightwave between a +1 order diffracted lightwave and a −1 order diffracted lightwave both from the phase grating mask 24c. On the other hand, in regions 22a, which are not exposed to the interference lightwave, the refractive index is maintained unchanged from the time of the film formation.

In this case, the interference lightwave between the +1 order diffracted lightwave and the −1 order diffracted lightwave appears with a period half that of the protrusion and recession of the relief-type phase grating mask 24c. Consequently, it is possible to use the relief-type phase grating mask 24c formed with a period of protrusion and recession two times the period of the intended high-refractive-index regions 22b in the DLC film. In addition, as the position approaches the center of the width of the high-refractive-index region 22b, the intensity of the interference lightwave increases. Consequently, similar to the case in FIG. 3, in the DLC film 22 in FIG. 4, also, the refractive index varies continuously in the vicinity of the boundary between the low-refractive-index region 22a and the high-refractive-index region 22b. As a result, a high diffraction efficiency can be achieved. If required, in place of the relief-type phase grating mask 24c, an amplitude-type phase grating mask obtained by the patterning of a chromium film, a chromium oxide film, an aluminum film, or the like can also be used.

In the method of producing the DLC hologram film shown in FIGS. 1 to 4, the case is shown as an example in which the boundary region between the high-refractive-index region and the low-refractive-index region is parallel to the direction of the thickness of the film. However, when required, of course, the boundary region may be slanted with respect to the direction of the thickness of the film. In order to do so, in the production method shown in FIGS. 1 to 3, for example, the energy beam needs only to be applied in a slanting direction with respect to the surface of the DLC film. In the production method shown in FIG. 4, also, the ultraviolet lightwaves 25c need only to be applied in a slanting direction with respect to the surface of the DLC film to utilize the exposure to the interference lightwave between the 0 order diffracted lightwave and either the +1 order diffracted lightwave or the −1 order diffracted lightwave. In this case, however, the interference lightwave between the 0 order diffracted lightwave and either the +1 order diffracted lightwave or the −1 order diffracted lightwave appears with the same period as that of the protrusion and recession of the phase grating mask 24c. Consequently, it is necessary to use a phase grating mask 24c having the protrusion and recession formed with the same period as the intended period of the high-refractive-index regions 22b in the DLC film.

Figure 5:
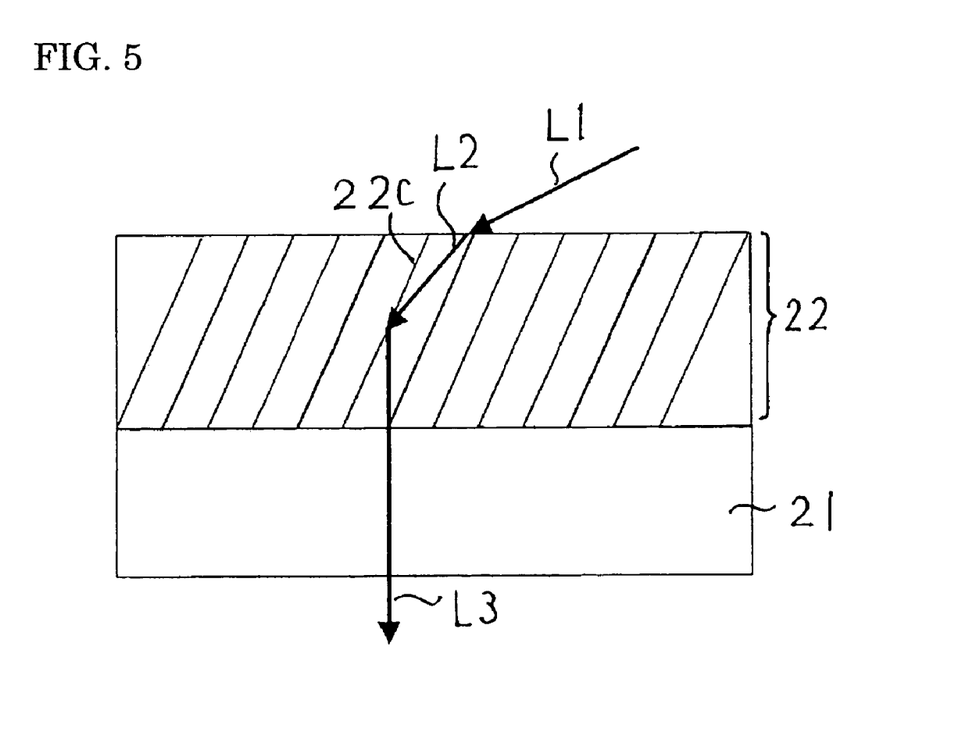
FIG. 5 is a schematic cross section illustrating an example of the diffraction due to the Bragg reflection in a hologram color filter in which the boundary between the high-refractive-index region and the low-refractive-index region is slanted with respect to the direction of the thickness of the DLC film.

FIG. 5 is a schematic cross section illustrating an example of the case in which it is desirable that the boundary region between the high-refractive-index region and the low-refractive-index region be slanted with respect to the direction of the thickness of the film. More specifically, in a DLC hologram film 22 on a glass substrate 21, a boundary region 22c between the high-refractive-index region and the low-refractive-index region is slanted with respect to the direction of the thickness of the film. In this case, for example, an incident lightwave L1 becomes a lightwave L2 due to the refraction at the time of entering the DLC film 22. Then, the lightwave L2 becomes a lightwave L3 after being diffracted with high efficiency at a specific Bragg reflection angle, θ, at the boundary region 22c between the high-refractive-index region and the low-refractive-index region. Because the boundary region 22c is slanted with respect to the direction of the thickness of the DLC film, the diffracted lightwave L3 can be projected in a direction orthogonal to the surface of the DLC film. In other words, the diffracted lightwave L3 can be effectively projected in a direction orthogonal to the surface of a liquid crystal panel, for example.

Figure 6:
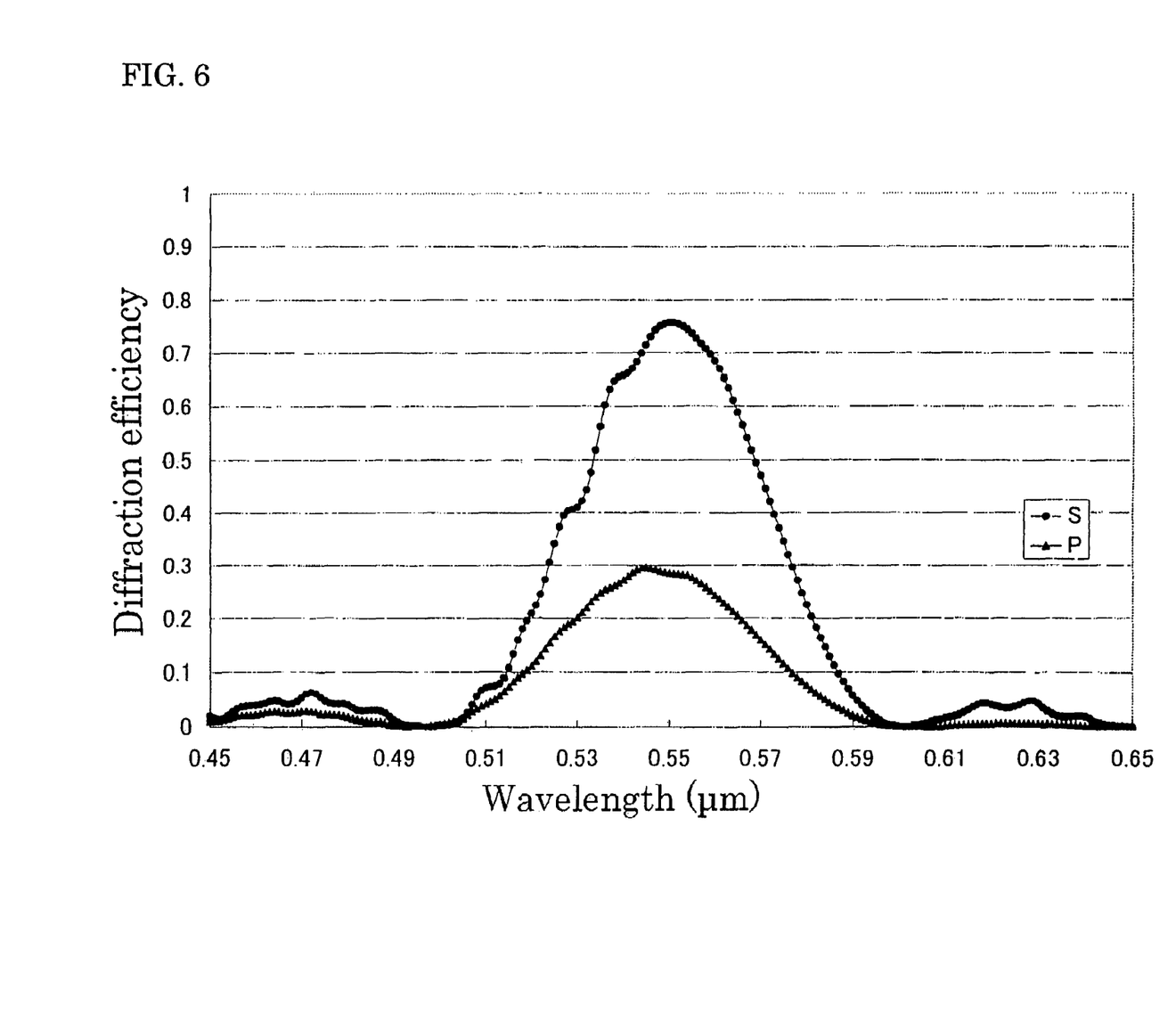
FIG. 6 is a graph showing the wavelength dependence and polarization dependence of the diffraction efficiency in a refractive-index-modulated-type diffraction grating having a refractive-index variation, $\Delta n$, of 0.04.
Figure 7:
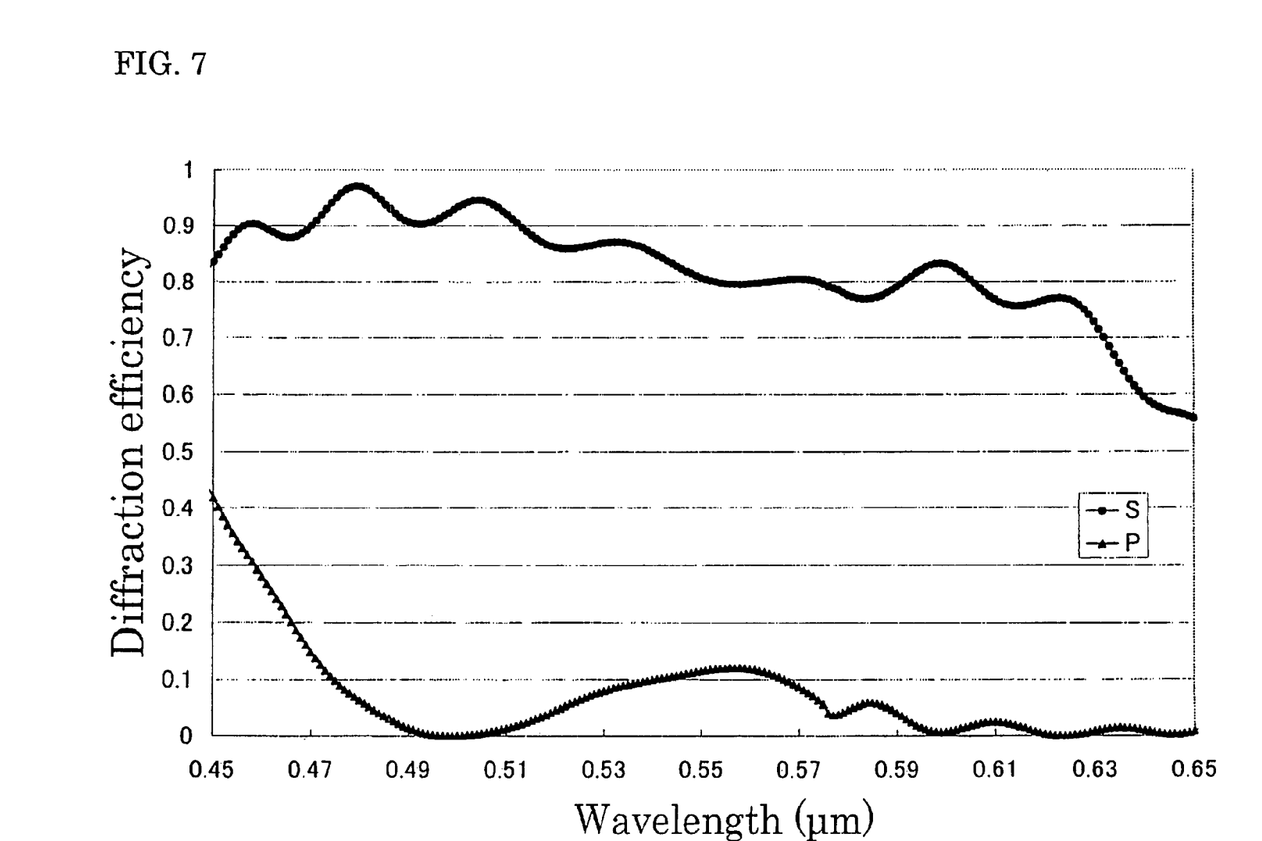
FIG. 7 is a graph showing the wavelength dependence and polarization dependence of the diffraction efficiency in a refractive-index-modulated-type diffraction grating having a refractive-index variation, $\Delta n$, of 0.5.

FIGS. 6 and 7 are graphs each showing an example of the result of a computer simulation on the influence of the refractive-index variation, Δn, on the diffraction efficiency in a refractive-index-modulated-type hologram film. In each of the graphs, the horizontal axis represents the wavelength (μm) of the lightwave, and the vertical axis the diffraction efficiency. A curve plotted by black circles represents the diffraction efficiency on an s-polarized lightwave, and a curve plotted by black triangles the diffraction efficiency on a p-polarized lightwave.

In FIG. 6 on a refractive-index-modulated-type hologram film incorporating a photopolymer film, the parameters are predetermined as follows: Δn is 0.04; the film thickness is 6.6 μm; the duty ratio, which is a ratio of the width of the high-refractive-index region to that of the low-refractive-index region, is 0.46; the incident angle of a lightwave is 30 degrees; and the period of the high-refractive-index region and the low-refractive-index region is 367 nm. On the other hand, in FIG. 7 on a refractive-index-modulated-type hologram film incorporating a DLC film, the parameters are predetermined as follows: Δn is 0.5; the film thickness is 2.1 μm; the duty ratio, which is a ratio of the width of the high-refractive-index region to that of the low-refractive-index region, is 0.5; the incident angle of a lightwave is 50 degrees; and the period of the high-refractive-index region and the low-refractive-index region is 326 nm. Here, the DLC film is predetermined to have a thickness less than one-third that of the photopolymer film, because in the case in which Δn is large, even when the film thickness is small, sufficient diffraction efficiency can be achieved.

As can be seen from FIG. 6, in a hologram film made of a photopolymer film, it is not easy to achieve a diffraction efficiency of 70% at the maximum. Furthermore, at the same angle of incidence, the wavelength range is very narrow that can achieve a good diffraction efficiency. On the other hand, as can be seen from FIG. 7, in a hologram film made of a DLC film, it is easy to achieve a diffraction efficiency of 70% or more. Furthermore, at the same angle of incidence, the wavelength range is very wide that can achieve a good diffraction efficiency. In addition, in a hologram film made of a DLC film, it is easy to reduce the diffraction-efficiency variation with respect to the incident lightwave to 40% or less in a wavelength range, for example, from a wavelength of 470 nm in the blue-color-light region to a wavelength of 630 nm in the red-color-light region. The value can even be reduced to 30% or less. This means that when a B lightwave, a G lightwave, and an R lightwave are applied at the same angle of incidence, in a hologram film made of a photopolymer film, the three color lightwaves cannot be diffracted with a comparable efficiency. In contrast, in a hologram film made of a DLC film, the three color lightwaves can be diffracted with nearly the same efficiency.

In a reflection-type color liquid crystal projector as shown in FIGS. 9 and 14, either an s-polarized lightwave or a p-polarized lightwave is mainly introduced into the hologram film, and the diffracted lightwave of it is applied to a liquid crystal panel. Then, the lightwave is reflected from the liquid crystal panel to be converted into an s-polarized lightwave or a p-polarized lightwave. The polarized lightwave passes through the hologram film to be projected onto a screen. Therefore, it is desirable that the hologram film diffract with high efficiency one of the s-polarized lightwave and the p-polarized lightwave and pass through the other without diffracting it. In the hologram film to be used in a reflection-type color liquid crystal projector, it is generally desirable to create a diffraction-efficiency difference of at least 30% with respect to the s-polarized lightwave and the p-polarized lightwave.

As can be seen from FIG. 7, in the hologram film made of a DLC film, it is easy to achieve a diffraction-efficiency difference of at least 30% with respect to the s-polarized lightwave and the p-polarized lightwave in a wavelength range, for example, from a wavelength of 470 nm in the blue-color-light region to a wavelength of 630 nm in the red-color-light region. The value can also be increased to 50% or more. This means that even when a B lightwave, a G lightwave, and an R lightwave are applied at the same angle of incidence, in a hologram film made of a DLC film, the three color lightwaves can be projected onto a screen with a mutually comparable and sufficient brightness.

FIGS. 6 and 7 each show an example of a hologram film having a higher diffraction efficiency for the s-polarized lightwave than for the p-polarized lightwave. Nevertheless, of course, it is possible to design a hologram film having a higher diffraction efficiency for the p-polarized lightwave than for the s-polarized lightwave. When a reflection-type color liquid crystal projector uses a hologram film having a higher diffraction efficiency for the p-polarized lightwave than for the s-polarized lightwave, the p-polarized lightwave is mainly introduced as the incident lightwave, as a matter of course.

Figure 8:
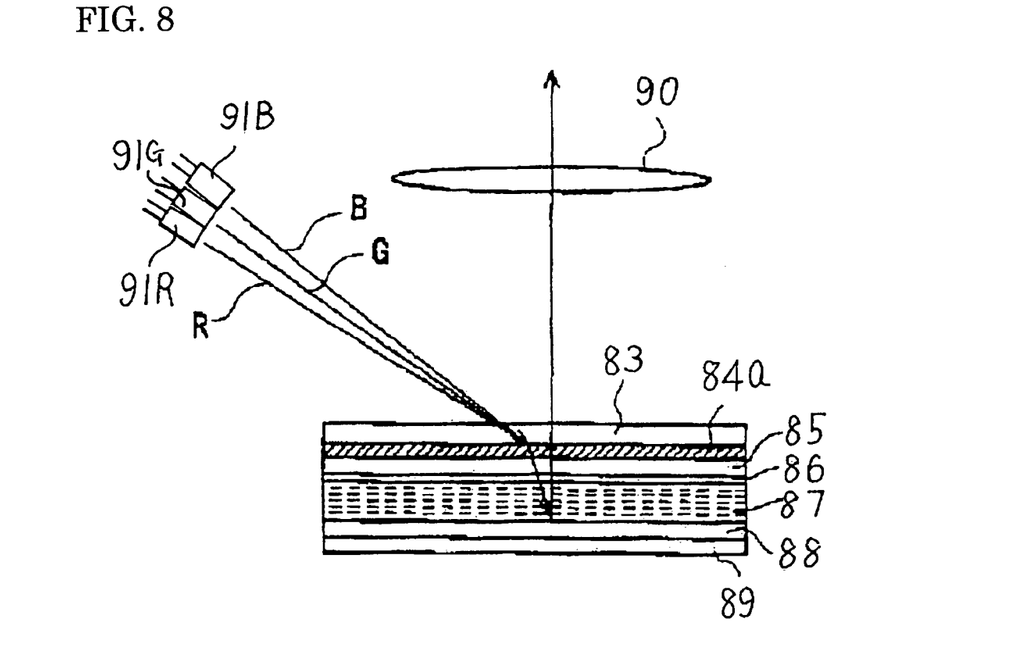
FIG. 8 is a schematic cross section illustrating an example of a color liquid crystal projector according to the present invention.

FIG. 8 is a schematic cross section illustrating an example of a color liquid crystal projector according to the present invention, although the cross section is similar to that shown in FIG. 14. The color liquid crystal projector in FIG. 8 differs from that in FIG. 14 only in the following aspects: (a) the hologram film 84 made of a photopolymer film is replaced by a hologram film 84a made of a DLC film and (b) the white-color light source 81 and the dichroic mirrors 82 are replaced by a blue-color-light-emitting device 91B, a green-color-light-emitting device 91G, and a red-color-light-emitting device 91R. As the device for emitting one of the three primary-color lightwaves, it is desirable to use a light-emitting diode (LED) or a semiconductor laser (LD). In this case, the individual colors are separated by the diffraction angle according to the individual wavelengths.

Semiconductor light-emitting devices can emit highly pure three primary-color lightwaves in comparison with those that are wavelength-separated from a white-color lightwave by using dichroic mirrors. In addition, the semiconductor light-emitting devices can be placed such that the individual color lightwaves are introduced into the hologram film 84a with the individual angles that can achieve the highest diffraction efficiency at the wavelengths of the three primary-color lightwaves. Consequently, the color liquid crystal projector shown in FIG. 8 can achieve a bright full-color projection image that has high color purity and excellent color-rendering property.

In the above explanation, FIGS. 8, 9, and 14 are explained by using a reflection-type color liquid crystal projector as an example. Nevertheless, a DLC hologram film according to the present invention can also be incorporated into a light-transmitting-type color liquid crystal projector, as a matter of course. For example, the partial difference between the reflection-type color liquid crystal projector shown in FIG. 9 and a light-transmitting-type color liquid crystal projector is explained below. First of all, it should be understood that by replacing the reflection-type electrode layer 4 with a transparent electrode layer, the reflection type can be converted into a light-transmitting type. In this case, it is not necessary to project the projection lightwave from the hologram film side. Therefore, the lightwave from the light source can also be applied at any angle from right behind the hologram film. In this case, in the refractive-index-modulated region in the DLC hologram film corresponding to one of the microlens regions 13 in the diffraction-grating pattern shown in FIG. 10, the width and spacing of the high-refractive-index regions need only to be decreased as the position approaches both ends from the center portion. Furthermore, a DLC hologram film according to the present invention can not only be incorporated into a projector type but also be desirably incorporated into an ordinary color liquid-crystal-display unit as shown in FIG. 11, as a matter of course. As the light source for a color liquid crystal projector and a color liquid-crystal-display unit both capable of incorporating the present invention, the following light sources can be used desirably: a halide lamp, a superhigh-pressure mercury lamp, a cold cathode-ray tube, a xenon lamp, a light-emitting diode, a semiconductor laser, an Ar laser, an He—Ne laser, a yttrium-aluminum-garnet (YAG) laser, and the like.

INDUSTRIAL APPLICABILITY

As described above, the present invention can offer a hologram color filter that can increase the utilization efficiency of light and that is superior in resistance to heat. Accordingly, the present invention can offer a color liquid-crystal-display unit that has high brightness and improved color balance.

The invention claimed is:
1. A hologram color filter having a function of a color filter that diffraction-separates an incident lightwave using a hologram to project thus separated lightwaves having different wavelengths at intended positions with a specified spatial period, the hologram color filter comprising
(a) a light-transmitting substrate (21); and
(b) a light-transmitting diamond-like-carbon (DLC) film (22) formed on the substrate;
in the DLC film, a relatively-high-refractive-index belt-shaped region ($n_2$, 22b) and a relatively-low-refractive-index belt-shaped region ($n_1$, 22a) being placed alternately.
2. A hologram color filter as defined by claim 1, wherein the variation in diffraction efficiency with respect to the incident lightwave is at most 40% in a wavelength range from a wavelength of 470 nm in the blue-color-light region to a wavelength of 630 nm in the red-color-light region.
3. A hologram color filter as defined by claim 1, the hologram color filter being capable of creating a mutual difference of at least 30% in diffraction efficiency with respect to an s-polarized lightwave and a p-polarized lightwave in a wavelength range from a wavelength of 470 nm in the blue-color-light region to a wavelength of 630 nm in the red-color-light region.
4. A hologram color filter as defined by claim 1, the hologram color filter further comprising a microlens array to which the DLC film is combined; in the DLC film, the width and spacing of the high-refractive-index belt-shaped regions being predetermined on a fixed basis the microlens array comprising a plurality of microlenses placed at a period corresponding to the spatial period.
5. A hologram color filter as defined by claim 1, wherein the width and spacing of the high-refractive-index belt-shaped regions are varied periodically corresponding to the spatial period to combine a light-separating function and a microlens-array function.
6. A hologram color filter as defined by claim 1, the hologram color filter further comprising at least one DLC filmeach of the DLC films having a peak of diffraction efficiency for a lightwave having a wavelength different with each other.
7. A hologram color filter as defined by claim 6, wherein
(a) the DLC films comprise a first DLC film and a second DLC film and
(b) the first DLC film has a peak of diffraction efficiency for a red-color lightwave, and the second DLC film has a peak of diffraction efficiency for a blue-color lightwave.
8. A hologram color filter as defined by claim 1, wherein the refractive index is varied in multiple stages in the boundary region from the low-refractive-index belt-shaped region to the high-refractive-index belt-shaped region.
9. A hologram color filter as defined by claim 1, wherein the refractive index is varied continuously in the boundary region from the low-refractive-index belt-shaped region to the high-refractive-index belt-shaped region.
10. A hologram color filter as defined by claim 1, wherein the boundary region between the low-refractive-index belt-shaped region and the high-refractive-index belt-shaped region is slanted with respect to the direction of the thickness of the DLC film.
11. A method of producing a hologram color filter as defined by claim 1, wherein the DLC film is formed by plasma CVD.
12. A method of producing a hologram color filter as defined by claim 11, wherein the relatively-high-refractive-index regions in the DLC film are formed by treating the DLC film with any one method selected from the group consisting of an ultraviolet-light irradiation, an x-ray irradiation, a synchrotron-radiation-light irradiation, an ion-beam irradiation, and an electron-beam irradiation.
13. A method of producing a hologram color filter as defined by claim 12, wherein the relatively-high-refractive-index regions (22b) in the DLC film (22) are formed by the exposure to ultraviolet rays having a periodical intensity distribution, the ultraviolet rays being obtained by the interference between two types of diffracted lightwaves having passed through a phase grating mask (24c).
14. A color liquid-crystal-display unit, comprising
(a) a hologram color filter as defined by claim 1; and
(b) a liquid crystal panel coupled with the hologram color filter;
the spatial period corresponding to the period of a plurality of pixels included in the liquid crystal panel.
15. A color liquid-crystal-display unit as defined by claim 14, wherein
(a) each of the pixels includes a red-color-displaying region, a green-color-displaying region, and a blue-color-displaying region and (b) the hologram color filter separates the incident lightwave into a red-color lightwave, a green-color lightwave, and a blue-color lightwave to project them to the red-color-displaying region, the green-color-displaying region, and the blue-color-displaying region, respectively.

16. A color liquid-crystal-display unit as defined by claim 14, the color liquid-crystal-display unit further comprising dichroic mirrors that separate a lightwave from a white-color light source into a red-color lightwave, a green-color lightwave, and a blue-color lightwave to give them to the hologram color filter as incident lightwaves;

each of the pixels including a red-color-displaying region, a green-color-displaying region, and a blue-color-displaying region;

the hologram color filter projecting the red-color lightwave, the green-color lightwave, and the blue-color lightwave, all separated from the incident lightwave, to the red-color-displaying region, the green-color-displaying region, and the blue-color-displaying region, respectively.

17. A color liquid-crystal-display unit as defined by claim 14, the color liquid-crystal-display unit further comprising as a light source any one light source selected from the group consisting of a halide lamp, a superhigh-pressure mercury lamp, a cold cathode-ray tube, a xenon lamp, a light-emitting diode, and a laser.

18. A color liquid-crystal-display unit, comprising
(a) any one member selected from the group consisting of a plurality of light-emitting diodes and a plurality of lasers (91B, 91G. and 91R), the member being for emitting a blue-color lightwave, a green-color lightwave, and a red-color lightwave individually
(b) a hologram color filter (84*a*) comprising a DLC film (22); and
(c) a liquid crystal panel (85-89) comprising a plurality of pixels arranged with a specific spatial period in the DLC film (22), a relatively-high-refractive-index belt-shaped region ($n_2$, 22*b*) and a relatively-low-refractive-index belt-shaped region ($n_1$, 22*a*) being formed alternately the width and spacing of the high-refractive-index belt-shaped regions being varied periodically corresponding to the spatial period of the pixels.

19. A method of producing a color liquid-crystal-display unit as defined by claim 18, wherein the relatively-high-refractive-index regions ($n_2$, 22*b*) in the DLC film (22) are formed by the exposure to ultraviolet rays having a periodical intensity distribution, the ultraviolet rays being obtained by the interference between two types of diffracted lightwaves having passed through a phase grating mask (24*c*).

* * * * *